United States Patent [19]
Somerset

[11] 3,770,971
[45] Nov. 6, 1973

[54] ROTATING SHAFT ENCODER
[75] Inventor: James P. Somerset, Wethersfield, Conn.
[73] Assignee: The Superior Electric Company, Bristol, Conn.
[22] Filed: May 24, 1972
[21] Appl. No.: 256,477

[52] U.S. Cl. .......................... 250/231 SE, 250/233
[51] Int. Cl. .......................... G01d 5/34, G01d 5/36
[58] Field of Search ..................... 250/231 SE, 233

[56]         References Cited
          UNITED STATES PATENTS
1,886,188   11/1932   Hough ........................... 250/233 X
3,497,959   3/1970   Engelsman ..................... 250/233 X
3,559,065   1/1971   Grundy ........................ 250/231 SE Primary Examiner—James W. Lawrence
Assistant Examiner—T. N. Grigsby
Attorney—Arthur A. Johnson et al.

[57]         ABSTRACT

An encoder for producing an electrical output for each incremental rotational movement of a motor or other shaft.

9 Claims, 5 Drawing Figures

ROTATING SHAFT ENCODER

The present invention has particular utility when it is desired to monitor the movement of a rotating shaft by providing an electrical pulse for each incremental rotational movement of the shaft. While it is usable to provide a pulse for each revolution, it is preferably employed with a stepping motor having a number of equal steps per revolution, such as 200, to provide a pulse for each step. In addition, another series of pulses may be produced in order to enable the direction of movement to be ascertained. While such devices have heretofore been proposed, they have not been found completely satisfactory for many reasons which include their cost, difficulty in mechanically positioning the encoder with respect to the shaft, reliability, etc.

It is accordingly an object of the present invention to provide an encoder that provides an electrical signal for each incremental movement of a rotating shaft and which can be easily adjusted to provide the signal at a selected location relative to the ends of each incremental movement.

Another object of the present invention is to provide an encoder that uses semiconductor optical elements and in which each pair of optical elements that produces a series of pulses are mounted together as a unitary assembly capable of independent machanical adjustment.

A further object of the present invention is to achieve the above objects with an encoder that is economical to manufacture, reliable in use, compact in size and conveniently mountable with respect to a shaft.

In carrying out the present invention, there is provided a hub that is mounted on the shaft with the hub carrying a disk on which there is an aperture for each increment of movement per revolution for which a pulse is desired to be produced. Semiconductor optical elements including a light source and a photo transistor are mounted together to form an optical assembly with a gap therebetween and positioned to have the disk pass in the gap. Thus, as the shaft is rotated, the light emitted from the light source is received by the photo transistor each time an aperture is within the gap. The change in conductivity of the photo transistor caused by the received light is sensed and by use of an appropriate squaring circuit, a logic 1 or 0 voltage signal is obtained that may be subsequently used in other equipment that requires information concerning shaft movement.

In addition to the optical assembly for producing the counting pulses, there is also provided another optical assembly of identical construction for providing similar pulses with these pulses however being slightly out of phase with the pulses produced by the first optical assembly. The latter pulse may be considered as gating pulses and used to determine the direction of rotation of the shaft while the former may be considered counting pulses.

In many instances as, for example, when being used with a stepping motor having a plurality of steps or increments of movement per revolution and with each step commencing at a rest position and terminating at an adjacent rest position, it has been found necessary to accurately correlate the occurrence of the counting pulses with the rest positions of the motor. This is easily achieved according to the present invention by mounting the optical assembly as a unitary assembly on the frame and by being able to mechanically adjust the assembly relative to the apertures on the disk while the shaft is turning. Thus, if the counting pulses and the rest positions of the motor are simultaneously considered by use of an appropriate electrical instrument, the time of the occurrence of the counting pulses may, by mechanical movement, be easily, accurately and quickly adjusted with respect to the rest positions. Moreover, the gating pulses are easily made to bear a definite phase relationship to the counting pulses by the use of the same instrument by mechanically adjusting the gating pulse optical assembly with respect to the apertures on the disk while considering both pulses. Accordingly, by enabling separate and independent mechanical adjustment of each optical assembly, the disk is not required to be mounted on the shaft in any particular location and neither do the parts of the encoder be required to be made to extremely close dimensional tolerances.

Other features and advantages will hereinafter appear.

Referring to the drawing.

Figure 1:
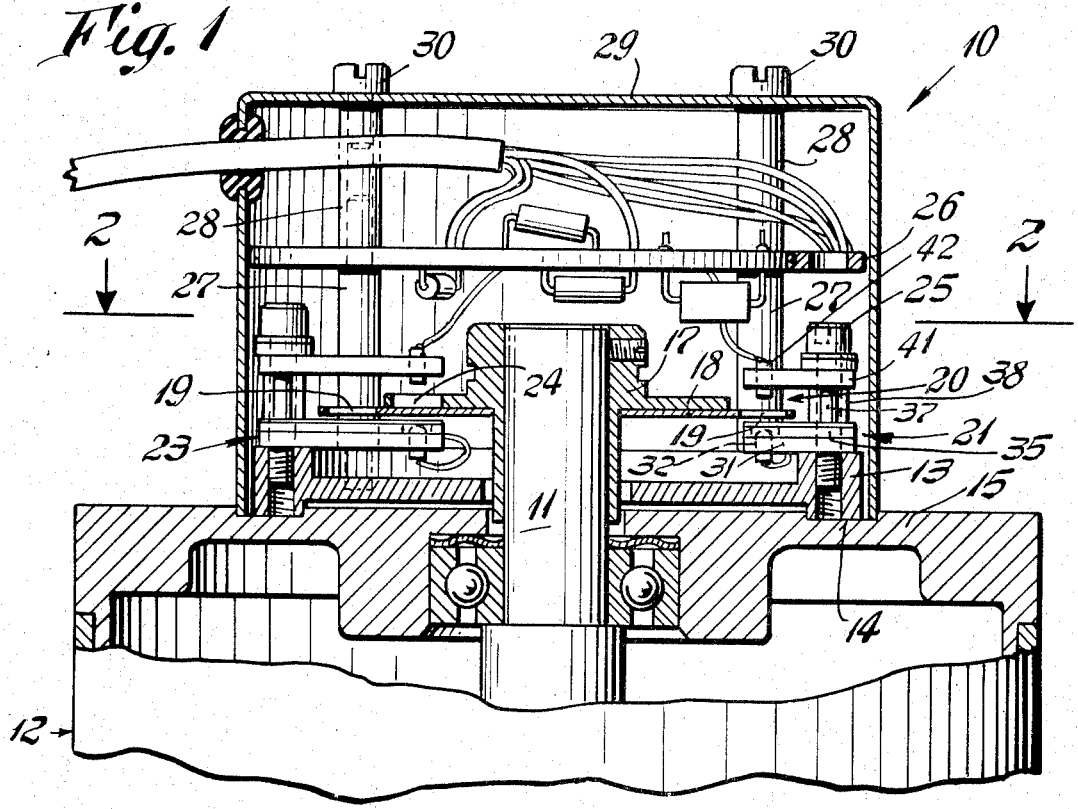
FIG. 1 is a section of the encoder of the present invention somewhat enlarged.
Figure 2:
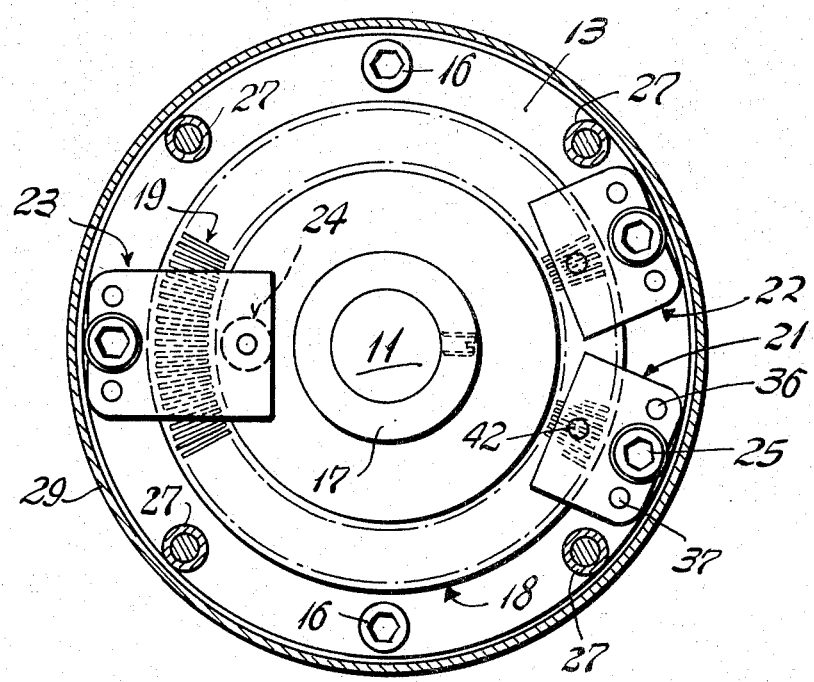
FIG. 2 is a view taken on line 2—2 of FIG. 1 also enlarged.

In the drawing, the encoder of the present invention is generally indicated by the reference numeral 10 and is shown mounted on a shaft 11 which may be one end of a double ended shaft stepping motor 12 which provides 200 steps per revolution. Such a motor is commercially available from the assignee of the present invention under the trade-mark "SLO-SYN." The encoder frame 13 has a peripheral portion which fits within an annular groove 14 formed in the end bell 15 of the motor and screws, such as screws 16, extend through the frame 13 to thread into the end bell 15 to secure the encoder essentially concentrically on the motor.

Mounted on the shaft 11 is a hub 17 carrying a disk 18 with the latter being formed with a plurality of radial apertures 19, there being one aperture for each step of the motor in a revolution. The peripheral portion of the disk 18 having the apertures extends into a gap 20 formed in an optical assembly 21 and in the gap of another optical assembly 22 to have the optical assemblies 21 and 22 to be responsive to each aperture 19 that appears in their respective gaps.

If desired, to provide an electrical pulse for each revolution of the motor rather than for each step, a third optical assembly 23 may be provided which senses the appearance of an aperture 24 formed inwardly of the disk 18 from the apertures 19 and which passes through the gap formed in the optical assembly 23. Each of the optical assemblies is secured to the annular frame 13 only by a single screw, as for example, the screw 25 holding the optical assembly 21.

The optical assemblies are electrically interconnected to a circular printed circuit board 26 that is supported by a plurality of spacers 27 which thread into the annular frame 13 an by internally threaded spacers 28 which thread into the spacers 27 so as to clamp the circuit board 26 therebetween. In addition, a cover 29 may be provided and held in place by screws 30 which thread into the spacers 28. Wires may be conveniently introduced through the cover 29 to provide power for the encoder and also to conduct the electrical pulses therefrom.

Figure 3:
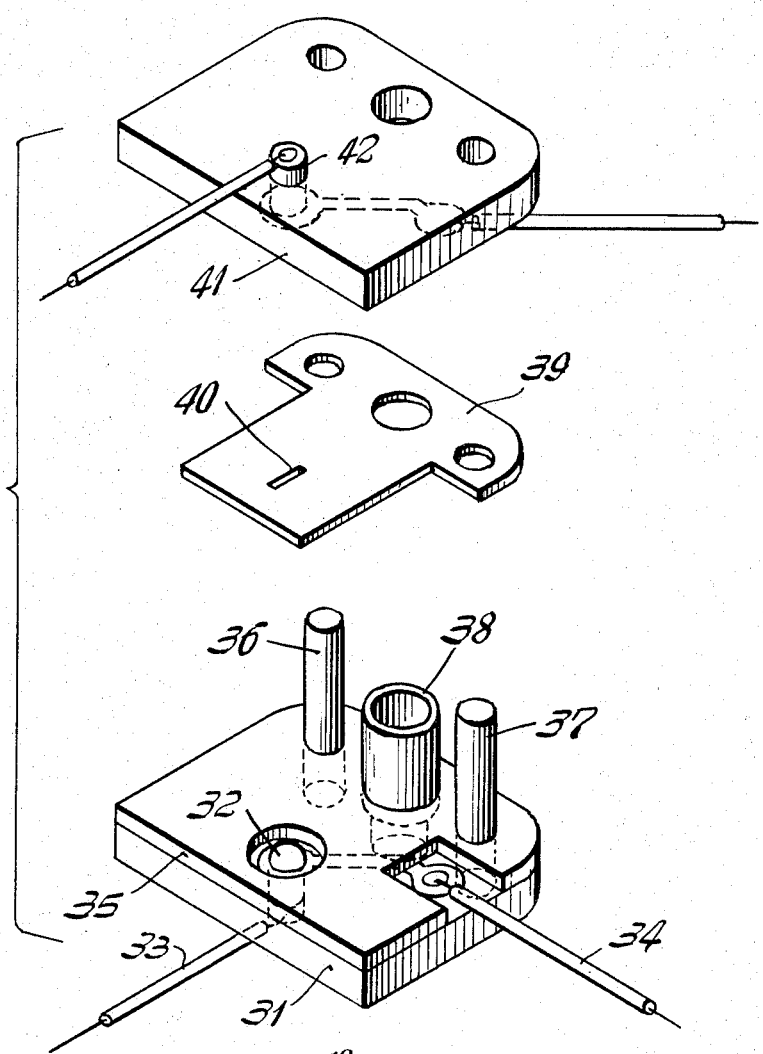
FIG. 3 is an enlarged exploded view of an optical assembly.

Referring to FIG. 3 there is shown an optical assembly which may be either of the assemblies 21 or 22 and which if elongated slightly may be optical assembly 23. As shown, this typical optical assembly includes a first support 31 which has a silicon photo transistor 32 secured thereon and with the leads 33 and 34 being connected thereto. The support 31 is preferably formed as a printed circuit board to provide a portion of the connection between the lead 34 and the photo transistor. A shield 35 formed of rigid insulating material is secured as by adhesive to the support 31 and dowel pins 36 and 37 are force fitted into the support 31 while a dowel post 38 is force fitted only into the insulating plate 35. A mask 39 formed of thin sheet metal to have a slit 40 is positioned on the pins 36 and 37 and post 38 to be on the surface of the shield 35 so as to be close to the sensing surface of the photo transistor 32 to limit the amount of light received thereby. Another support 41 which may also be formed from a printed circuit board carries a light emitting diode 42.

The optical assembly is formed by placing the mask 39 onto the insulating plate 35 and then placing the support 41 on the dowel pins until the upper edge of the post 38 abuts the bottom surface of the support 41. As the parts have a force fit with respect to each other, the act of pressing the support 41 onto the dowel pins causes mechanical securement between the parts. It will be appreciated that the height of the post 38 determines the gap between the optical elements 42 and 32 while permitting a screw such as the screw 25 to pass therethrough to secure the assembly to the frame. Also, the aligning pins 36 and 37 serve to position the parts with respect to each other sufficiently accurately.

In use, the annular frame 13 is secured to the end bell 15 without the printed circuit board or cover being attached. The hub with the disk 18 is secured on the shaft 11, the optical assemblies are then secured on the frame as by their respective screws such as screw 25, the printed circuit board is then secured in place by the spacers 28, the electrical connections are made between the optical assemblies and the printed circuit board and then the cover 29 is secured with the wires being passed therethrough.

Figure 4:
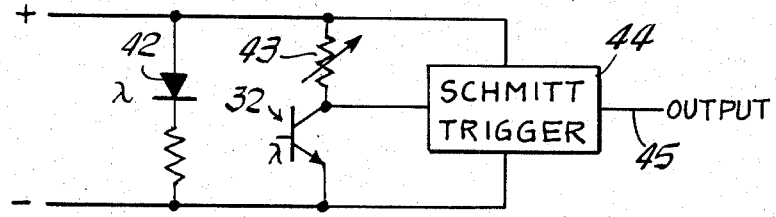
FIG. 4 is an electrical and diagrammatic illustration of the electrical components for producing one series of pulses.

As shown in FIG. 4 the light source 42 is connected across a D.C. source as is the emitter and collector of the photo transistor 32, the former may be a type TIL 23 and the latter may be a type TIL 603 both available from Texas Instruments Incorporated, Dallas, Texas. An adjustable resistance 43 is positioned in series with the photo transistor 32 across the D.C. source and the collector of the photo transistor 32 has a connection to a Schmitt trigger 44 which has an output 45. One form of the Schmitt trigger which may be employed being an integrated circuit type SN5413 also available from Texas Instruments, Incorporated. Accordingly, as each aperture 19 moves into and out of alignment with the slit 40, the transistor 32 will receive more light to increasingly conduct and then less light to decreasingly conduct to produce at the collector of transistor 32, essentially a half cycle sine wave such as indicated by the reference numeral 46 in FIG. 5. It is understood that there is a similar circuit for each optical assembly.

The output of the Schmitt trigger 44 for the optical assemblies 21 and 22 is desired to be essentially a square wave having 50 percent of the time a logical 1 and the other half of the time a logical 0. For adjusting the encoder initially, the motor 12 is energized at perhaps a 1000 steps per second by the use of a pulse to step circuit and the output 45 is connected to the input of an oscilloscope. The sweep of the oscilloscope is obtained from the energizing pulses to the motor with the oscilloscope producing a full sweep for each change of motor energization. The resistor 43 for the optical assembly 21 is adjusted so that its output 45 has a 50 percent logical 1 and 50 percent logical 0 voltage.

Figure 5:
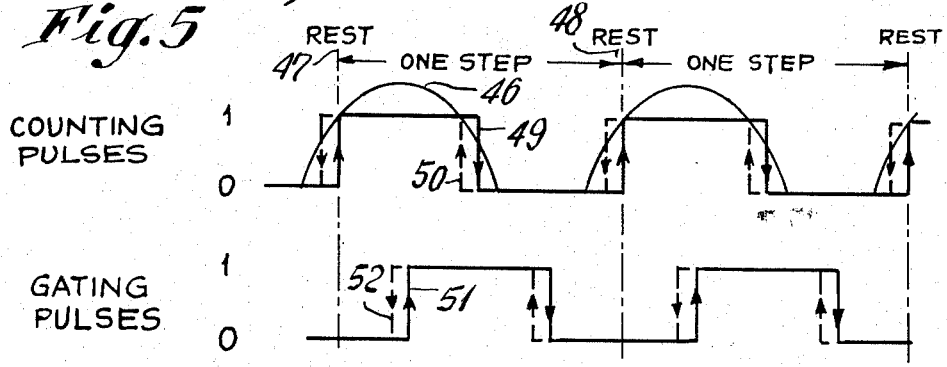
FIG. 5 is a diagrammatic representation showing the time relationship between the occurrences of the various pulses and the increments of movement.

The relative positions of the counting pulses from the assembly 21 is shown in FIG. 5. It is preferred to produce a change in the logic state at the middle of an increment or step between a rest position 47 and a rest position 48. To achieve this, the screw 25 is slightly loosened and the optical assembly 21 is slightly pivoted until for clockwise rotation of the motor the change occurs along the solid line 49. The motor is then caused to have a reverse rotation and the position of the optical assembly should cause a change to be made along the dotted line 50. If not, then the optical assembly is slightly moved. Thus by simply mechanically shifting the optical assembly, the location in each incremental step where a change of logic level occurs may be observed on the oscilloscope and accurately set to occur on the two lines 49 and 50.

The reason that the lines 49 and 50 do not coincide is because the hysteresis in the system and particularly in the Schmitt trigger 44 in that it takes a somewhat lower voltage at the collector of the photo transistor 32 to change the output 45 from a logical 1 to a 0 than it does to change from a 0 to a 1, i.e., lines 49 and 50 respectively. However, by the above process an accuracy of ± 5 per cent of one step may be obtained when a step is 0.5 per cent of one shaft rotation.

Having thus set the counting pulses, the encoder is further adjusted to position the gating optical assembly 22 to provide a change of logic level that is 90° out of phase with the counting pulses and also to have a pulse width that is a logical 1 for half the cycle and a logical 0 for the remaining half. The latter is achieved by adjusting the similar resistance 43 while the former requires connecting the counting pulses to the sweep of the oscilloscope and then mechanically adjusting the optical assembly 22 until the change of logic level such as the change indicated by the line 51 occurs at the middle of each logic 1 state of a counting pulse for a clockwise movement of the motor while for movement in the reverse direction the change of logic level occurs along the line 52.

Accordingly, by forming each optical assembly as a unitary assembly and mounting it in a manner which enables it to be mechanically relatively shifted with respect to the disk upon the frame of the encoder the present encoder achieves extreme accuracy with respect to the occurrence of the pulses with the rest positions of the motor and even accommodates for hysteresis in the system. The use of an oscilloscope permits the observing of the action of the encoder while the motor is running thereby eliminating the trial and error, stop and starting processes which had heretofore been utilized to adjust encoders.

It will be understood that the single pulse per revolution optical assembly 23 may similarly be adjusted as the counting pulse optical assembly 21 to provide a pulse at a definite location with respect to the rest positions adjacent thereto.

It has been found that with a motor of 200 steps per revolution, i.e., 1.8° steps, each aperture 19 has a width of about 0.9° while the disk between the apertures is of a similar width. Moreover, the slit 40 may have a width of about 0.009 inches so that for at least half of each step light is received by the photo-transistor.

It will accordingly be understood that there has been disclosed an encoder which is capable of being mounted onto a rotating shaft to produce a series of electrical pulses indicative to the movement of the shaft. When there are a plurality of increments of movement per revolution, the present invention enables, easily and quickly, the adjustment of the appearance of the pulse at a specific location in each increment between the rest positions that define the increment with substantial accuracy. Moreover, when another pulse is also desired to be produced and have a definite phase relationship to the first pulse, the encoder of the present invention also enables the adjustment of the location of the second pulse with respect to the first pulse. These results are accomplished through the use of a semiconductor optical assembly for each group of pulses with each optical assembly being capable of being mechanically shifted during the operation of the encoder so as to enable the accurate adjustment. When two semi-conductor optical assemblies are used, each is capable of being independently adjusted free from the other thereby enabling accuracy in setting the out of phase relationship of the second group of pulses with respect to the first group of pulses.

Variations and modifications may be made within the scope of the claims and portions of the improvements may be used without others.

I claim:

1. An encoder for producing an electrical pulse for each increment of movement of a rotating shaft comprising a hub having a disk provided with an aperture for each increment of movement a pulse is to be produced, said hub having means for mounting it on the shaft for rotation therewith, a stationary frame; a semiconductor optical assembly comprising a light source mounted on a support and a light responsive semiconductor element mounted on another support with said source being positioned opposite to said element but spaced by a gap therebetween, a mask having a slit positioned between the source and element and means securing the supports and mask together to form the unitary assembly; and means mounting the assembly on the frame with each aperture of the disk being positionable in the gap, said mounting means being releasable to enable mechanical shifting of the assembly on the frame to facilitate centering of the aperture and the slit at a selected rotative position on the shaft.

2. The invention as defined in claim 1 in which there is a second optical assembly having a light source mounted on a support and a light responsive semiconductor element mounted on another support with said source being positioned opposite to said element but spaced by a gap therebetween, a mask having a slit positioned between the source and element and means securing the supports and mask together to form the second unitary assembly; means mounting the second assembly on the frame with each aperture of the disk being positionable in the gap, said mounting means being releasible to enable shifting of the second assembly on the frame relative to the position of the first assembly and in which each said mounting means is independent of the other.

3. The invention as defined in claim 2 in which both assemblies are identical in construction and in which each element is a photo transistor and each source is a light emitting diode.

4. The invention as defined in claim 1 in which the means securing the supports and mask together includes means for effectuating alignment thereof.

5. The invention as defined in claim 4 in which the aligning means includes corresponding holes formed in the supports and mask and pins passing through the holes.

6. The invention as defined in claim 1 in which the mounting means includes just one securing device passing through a hole formed in the assembly and the shifting is a pivotal movement of the assembly about the securing device.

7. The invention as defined in claim 1 in which there are a plurality of apertures, one for each increment of movement in a revolution, in which there is a rest position between each increment and in which the assembly is mechanically adjusted to produce a signaling change in the electrical pulse substantially half way between two rest positions.

8. The invention as defined in claim 7 in which there is a second semiconductor optical assembly identical to the first, means for mounting the assembly on the frame with the apertures positionable in its gap and in which the mounting means in releasable to enable relative mechanical shifting of the second assembly relative to the first to cause a distinctive change in each electrical pulse of the second assembly to be produced 90° out of phase with the pulses produced by the first assembly.

9. The invention as defined in claim 8 in which an electrical pulse includes a distinctive change from one voltage level to another and in which there are adjustable means in each assembly for setting the duration that a pulse is at one voltage level and at the other voltage level.

* * * * *